(12) United States Patent
Monette et al.

(10) Patent No.: US 7,069,100 B2
(45) Date of Patent: Jun. 27, 2006

(54) AUTOMATED MANUFACTURING CONTROL SYSTEM

(75) Inventors: François Monette, Bromont (CA);
André Corriveau, Bromont (CA);
Vincent Dubois, Canton de Shefford (CA)

(73) Assignee: Cogiscan Inc., Bromont (CA)

( * ) Notice: Subject to any disclaimer, the term of this patent is extended or adjusted under 35 U.S.C. 154(b) by 0 days.

(21) Appl. No.: 10/257,401

(22) PCT Filed: Apr. 20, 2001

(86) PCT No.: PCT/CA01/00559

§ 371 (c)(1),
(2), (4) Date: Oct. 21, 2002

(87) PCT Pub. No.: WO01/82009

PCT Pub. Date: Nov. 1, 2001

(65) Prior Publication Data

US 2003/0102367 A1    Jun. 5, 2003

(30) Foreign Application Priority Data

| Apr. 20, 2000 | (CA) | 2306304 |
| Sep. 27, 2000 | (CA) | 2321009 |
| Nov. 17, 2000 | (CA) | 2326218 |
| Nov. 17, 2000 | (CA) | 2326301 |

(51) Int. Cl.
*G06F 19/00*    (2006.01)

(52) U.S. Cl. ................................. 700/116

(58) Field of Classification Search .......... 700/95, 700/97, 103, 104, 106, 108, 109, 115, 116, 700/121; 235/462.07, 375, 385; 340/10.1, 340/10.52
See application file for complete search history.

(56) References Cited

U.S. PATENT DOCUMENTS

| 3,597,794 | A | * | 8/1971 | Mann .......................... 425/140 |
| 4,990,756 | A | | 2/1991 | Hoemann .................... 235/435 |
| 5,126,028 | A | * | 6/1992 | Hurwitt et al. ........ 204/192.13 |
| 5,131,752 | A | | 7/1992 | Yu et al. ...................... 356/369 |
| 5,321,619 | A | | 6/1994 | Matsuda et al. ............. 700/116 |
| 5,389,769 | A | | 2/1995 | Yamashita et al. .......... 235/375 |

(Continued)

FOREIGN PATENT DOCUMENTS

DE    43 27 342 A    2/1995

(Continued)

OTHER PUBLICATIONS

Patent Abstracts of Japan, vol. 1999, No. 04, Apr. 30, 1999 & JP 11 025243 A (Toshiba Chem Corp), Jan. 29, 1999 abstract.

(Continued)

*Primary Examiner*—Leo Picard
*Assistant Examiner*—Chad Rapp

(57) ABSTRACT

An automated manufacturing control system is proposed to greatly reduce the human interaction relative to the data transfer, physical verification and process control associated with the movement of components, tooling and operators in a manufacturing system. This is achieved by the use of data carriers which are attached to the object(s) to be traced. These data carriers (12) can store all the relevant identification, material and production data to required by the various elements, e.g. stations, of the manufacturing system. Various readers, integrated with controllers and application software, are located at strategic points of the production area, including production machines and storage areas, to enable automatic data transfer and physical verification that the right material is at the right place at the right time, using the right tooling.

32 Claims, 9 Drawing Sheets

U.S. PATENT DOCUMENTS

| | | | |
|---|---|---|---|
| 5,570,293 A | 10/1996 | Tanaka et al. | 700/121 |
| 5,583,819 A | 12/1996 | Roesner et al. | 340/10.51 |
| 5,621,199 A | 4/1997 | Calari et al. | 235/375 |
| 5,708,419 A | 1/1998 | Isaacson et al. | 340/572.5 |
| 5,910,776 A | 6/1999 | Black | 340/10.1 |
| 5,942,739 A | 8/1999 | Zvonar et al. | 235/462.01 |
| 6,027,019 A | 2/2000 | Kou | 235/375 |
| 6,027,022 A | 2/2000 | Hong | 235/462.01 |
| 6,078,251 A | 6/2000 | Landt et al. | 340/10.41 |
| 6,078,845 A * | 6/2000 | Friedman | 700/104 |
| 6,148,291 A | 11/2000 | Radican | 705/28 |
| 6,150,921 A | 11/2000 | Werb et al. | 340/10.1 |
| 6,299,712 B1 * | 10/2001 | Ibarra | 156/60 |
| 6,560,839 B1 * | 5/2003 | Tow | 29/407.01 |
| 6,640,151 B1 * | 10/2003 | Somekh et al. | 700/121 |
| 6,714,121 B1 * | 3/2004 | Moore | 340/10.3 |
| 6,763,578 B1 * | 7/2004 | Farnworth et al. | 29/833 |

FOREIGN PATENT DOCUMENTS

| | | |
|---|---|---|
| DE | 44 01 070 C | 4/1995 |
| DE | 296 01 134 U | 6/1996 |
| DE | 197 03 823 C | 5/1998 |
| DE | 197 03 819 C | 8/1998 |
| DE | 197 45 228 A | 6/1999 |
| DE | 198 13 842 A | 9/1999 |
| EP | 0 619 246 A | 10/1994 |
| EP | 0 859 299 A | 8/1998 |
| GB | 2 114 821 A | 8/1983 |
| WO | WO 00 02236 A | 1/2000 |

OTHER PUBLICATIONS

Patent Abstracts of Japan, vol. 1999, No. 12, Oct. 29, 1999 & JP 11 180545 A (Ten Tac KK), Jul. 6, 1999 abstract.

* cited by examiner

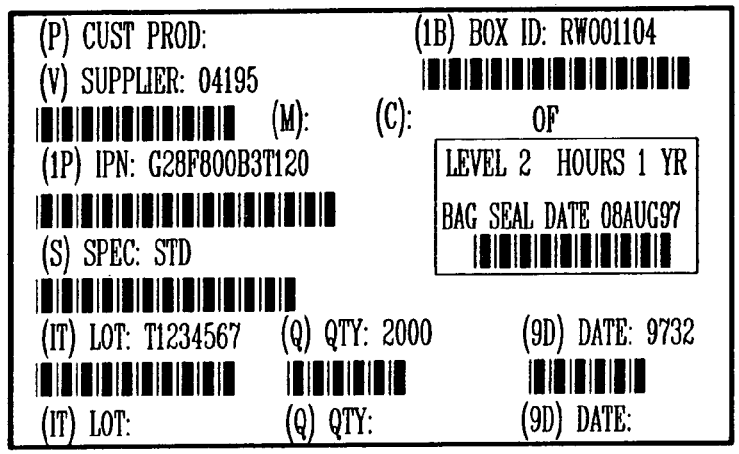
FIG_1
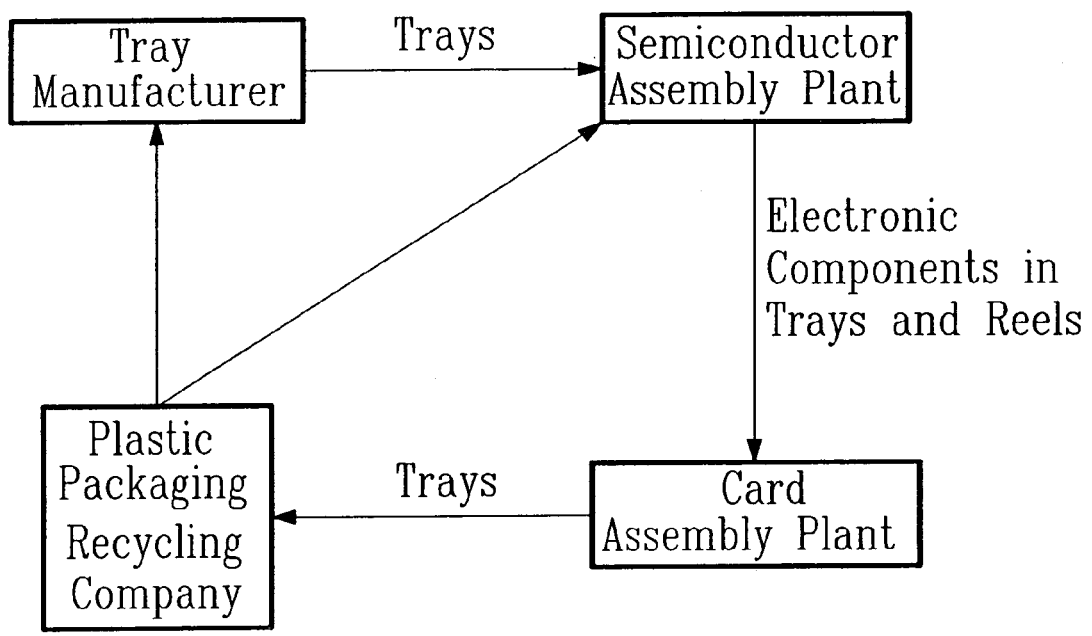
FIG_2

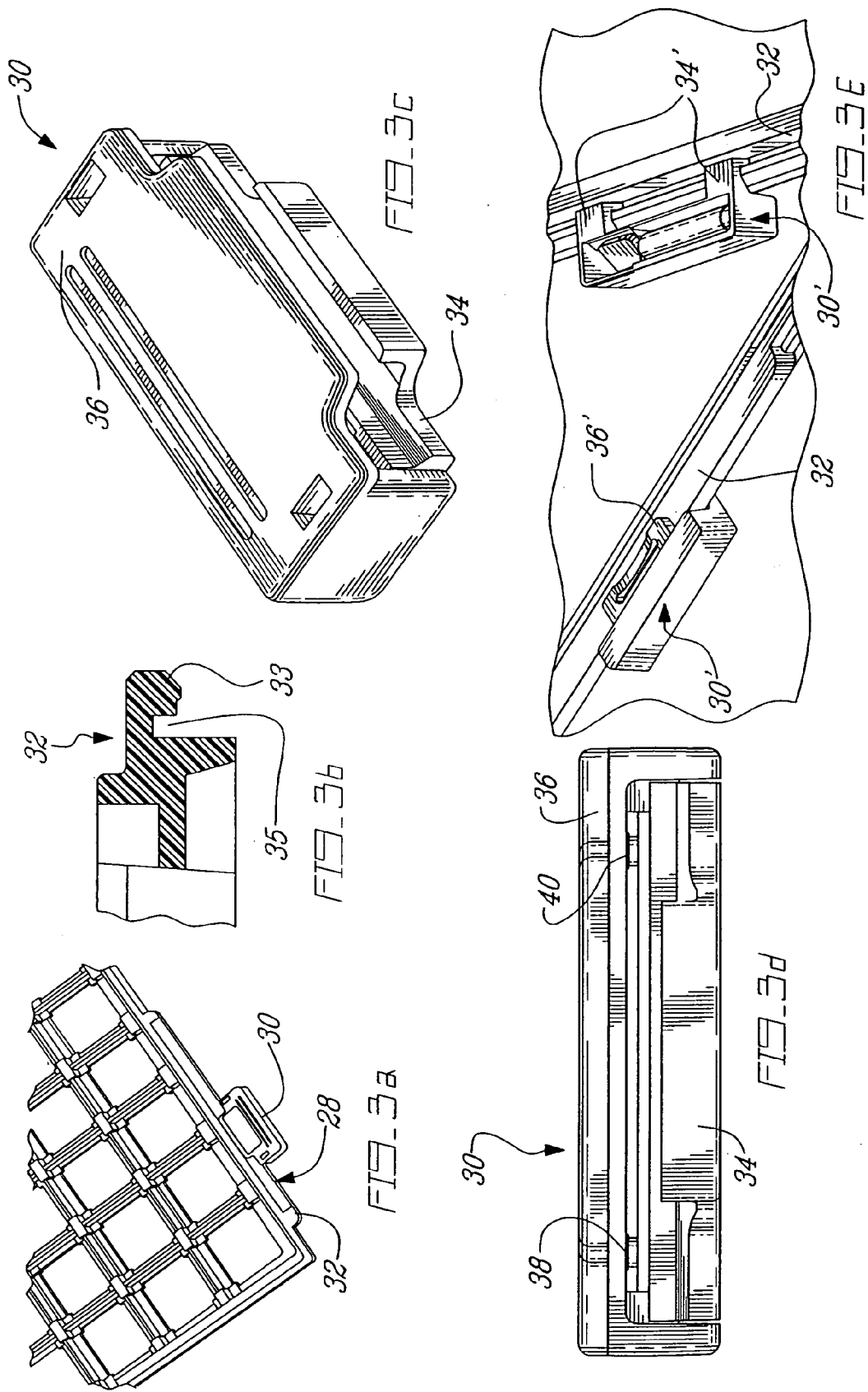

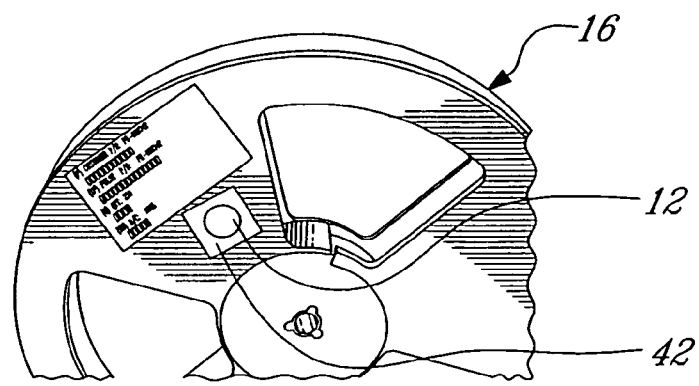
FIG_3f
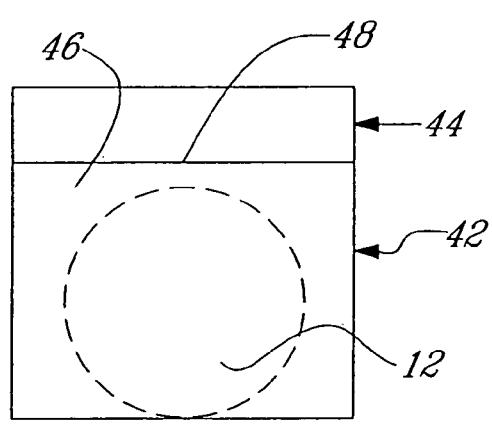
FIG_3g
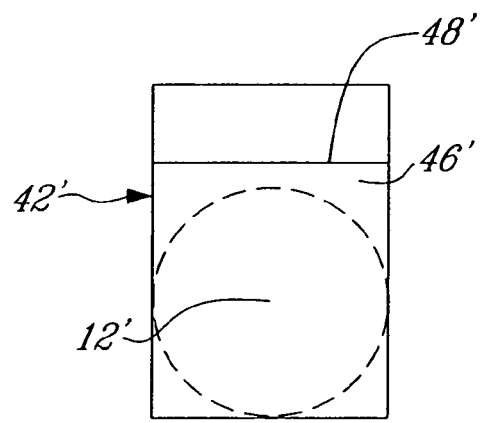
FIG_3h
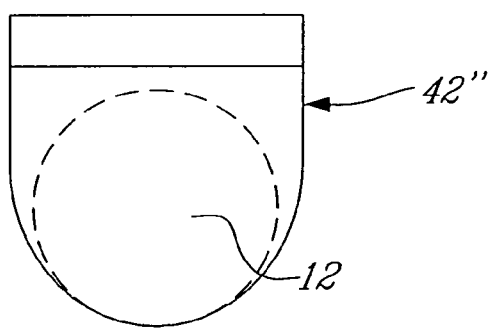
FIG_3i
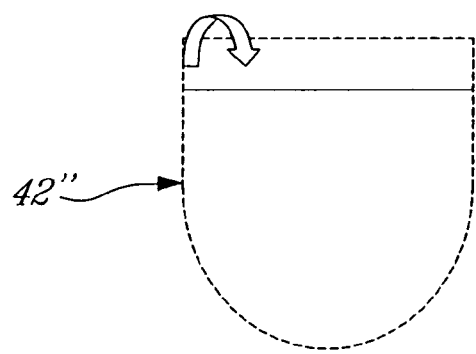
FIG_3j

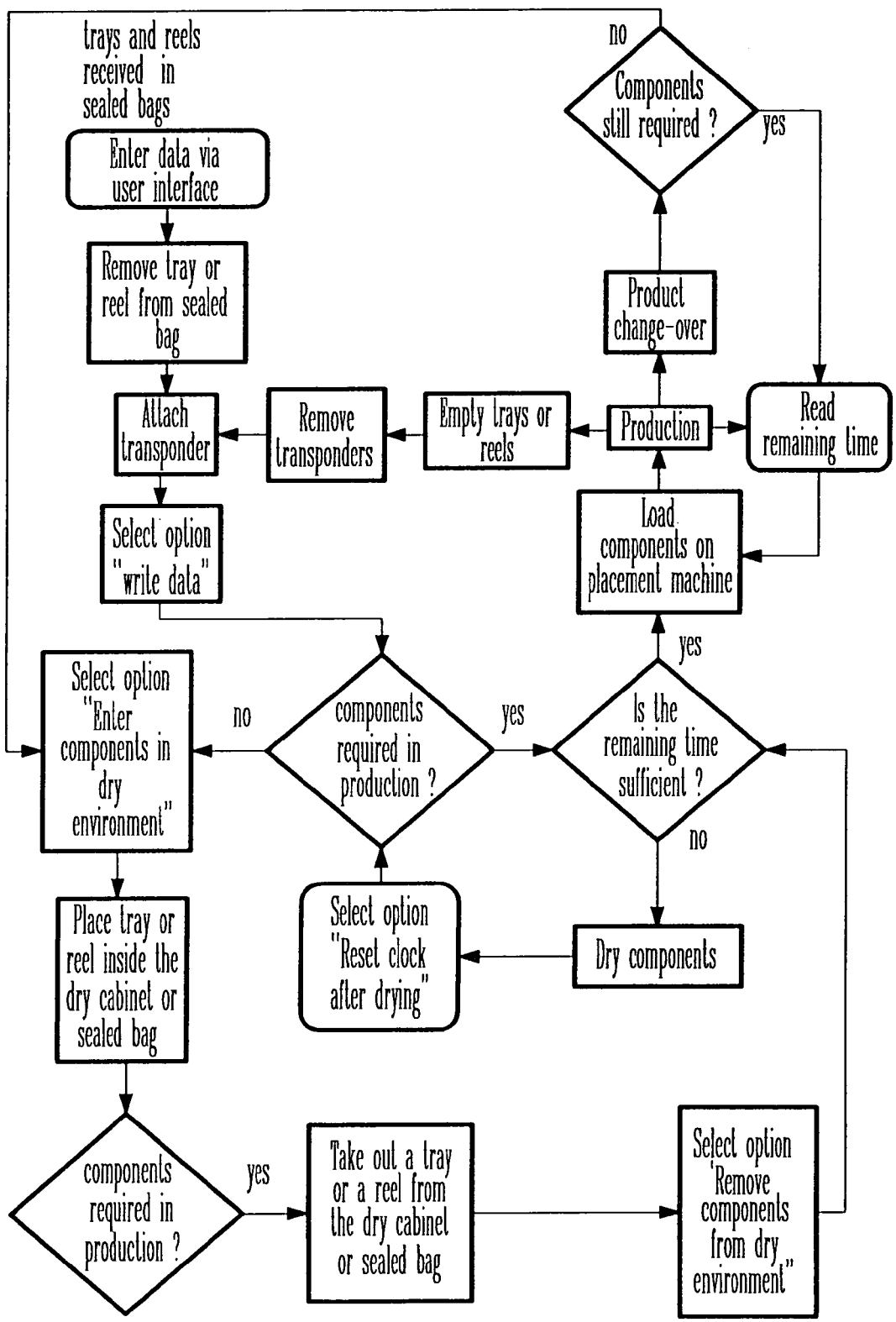
FIG_4

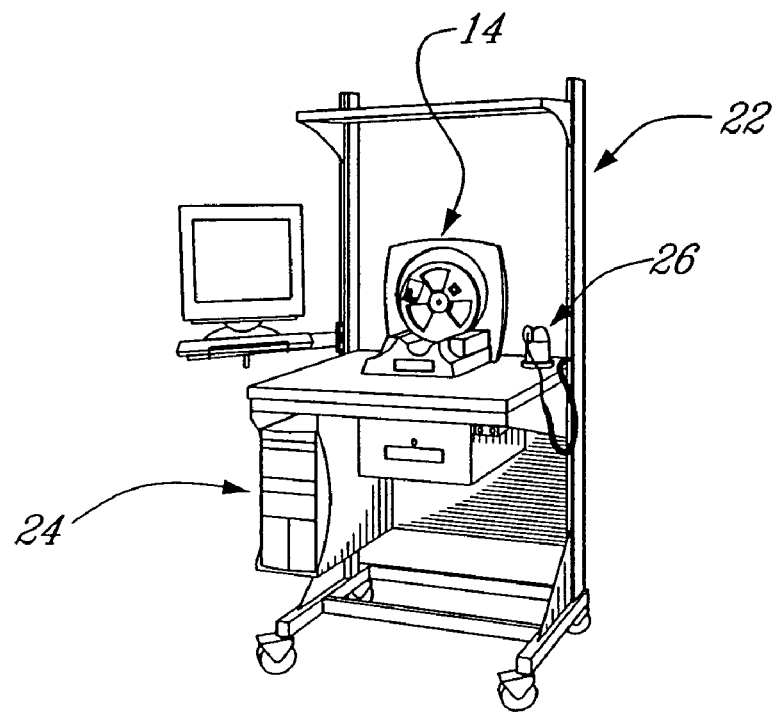
FIG_5a
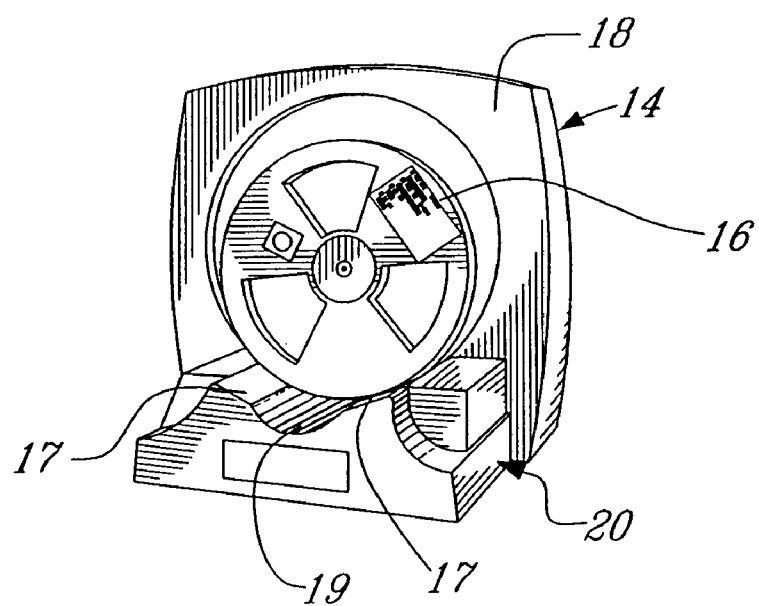
FIG_5b

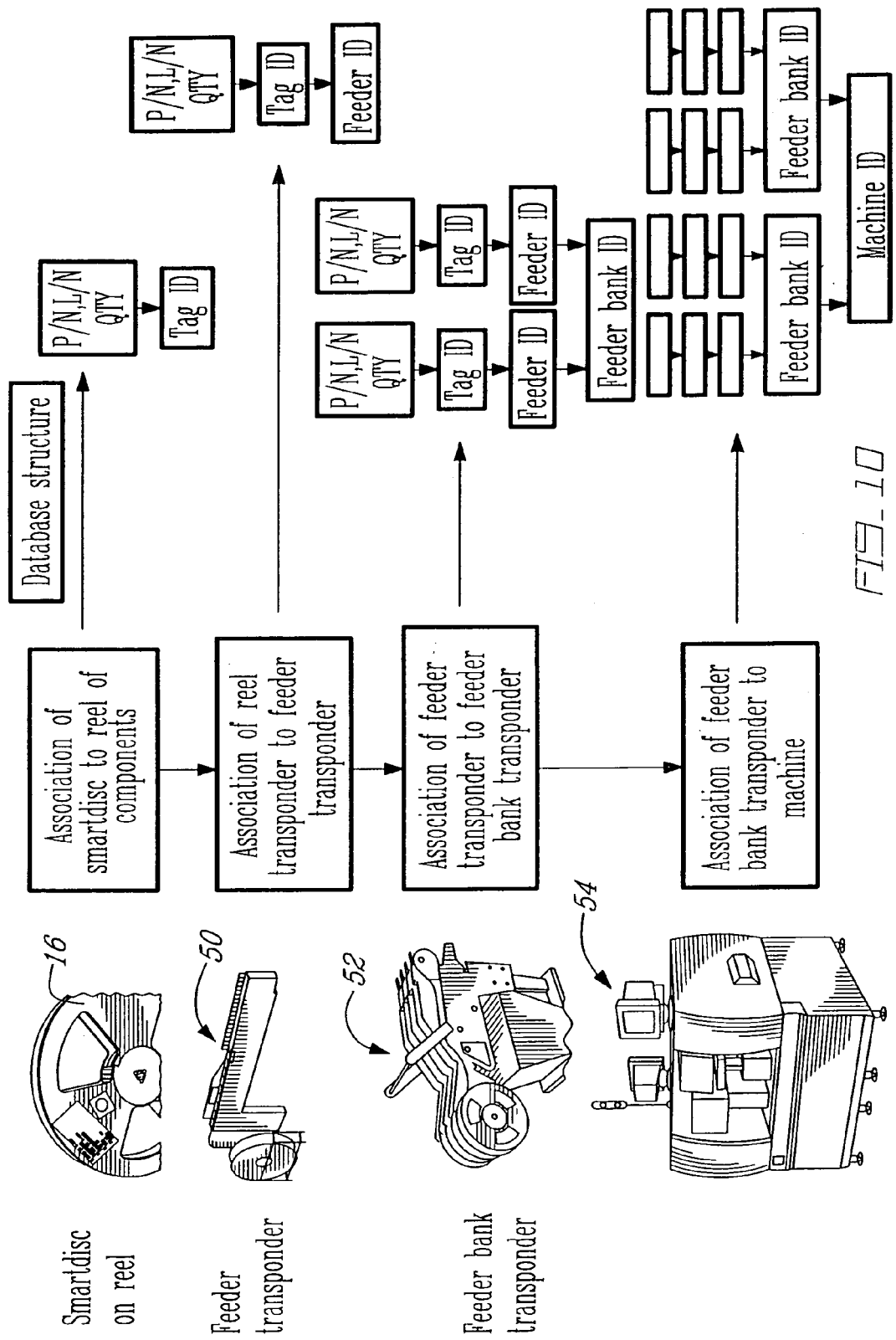

AUTOMATED MANUFACTURING CONTROL SYSTEM

FIELD OF THE INVENTION

The present invention relates to industrial automation and, more particularly, to a system and method for controlling and monitoring a manufacturing process.

BACKGROUND OF THE INVENTION

In a manufacturing system, in order to deliver the finished goods, a lot of elements have to be moved on the production floor from time to time as they are required in different locations. Most of these movements require a manual intervention, although some of them may be automated using robots, conveyors or some other means. Along with these movements, the necessary information needs to follow. In most occasions, this information follows manually, although there exists some ways to partly automate this aspect that will be discussed hereinbelow. Here are examples of movements that can occur in a manufacturing system and the related data that needs to follow these movements;

Machine set-up. In order to prepare a given machine to produce a given part, it needs to be set up with the right tooling, the right recipe or program and the right raw material. All these elements will have to be prepared and, if an error occurs and a wrong element is used or the wrong information about it is entered, the outgoing production will not conform to the specifications. Typically, this set-up is done manually.

Routing of parts. Parts being produced will need to be routed to different stations or machines in a given sequence. This sequence or the stations to be seen may be altered as different quality controls are passed or failed. This routing information needs to follow the goods being produced through the whole manufacturing system and is typically described on sheets of paper or, in the more advanced manufacturing facilities, it can be accessed on a host computer through terminals in strategic places on the manufacturing floor. A lot number generally needs to be entered in the computer in order to know the next process step to be seen and data is entered at each process step.

Physical inventory of raw material and work in progress (WIP). As the raw material is used in the manufacturing system, some may be left over and will await the next production lot that requires this given raw material. Also, as the goods are being produced, they will be moved from station to station in the manufacturing system. Both the raw material and the WIP will need to be tracked for inventory purposes and their physical location will be required to physically find these parts. Generally, this information is gathered manually and, in the best cases, entered in a computer software. This yields an inventory that relies highly on human interventions and that is always outdated as it is not in real-time.

Process control. In order to control the process and the quality of the manufactured products, some process and product information is gathered. This information needs to follow the product and feedback to the process control in order to adjust it.

Similarly, different types of information need to follow the production lots. In its simplest form, this data will be an identifier that will enable to trace back the information on the manufactured goods.

Automatic Identification Technology

In order to ease the burden for the operator and to reduce the risk of human errors, there exist a number of Automatic Identification (Auto ID) techniques that are used. These systems, such as barcode, Radio Frequency Identification (RFID) and Optical Character Recognition (OCR), are often used to provide a simple identification of an object and their primary benefit in this case is to reduce the time and possible errors associated with the manual entry of this information.

Barcode Technology

One general drawback of using barcodes is the need of a sufficiently large flat area to apply a barcode label which is not always available on raw material, its container, or other parts to be traced. Also, all barcode readers require direct line-of-sight with the barcode label. This can be a major restriction toward complete automation of the reading operation. Finally, barcodes offer a limited number of information that can be written only once (at the printing operation of the barcode) and thus that cannot be altered.

RFID Technology

In addition to barcode labels, which have now become fairly common on many standard materials and containers, some manufacturing systems take advantage of the greater capabilities associated with the use of Radio Frequency Identification (RFID) technology. A typical RFID system is always made up of two components: the transponder, which is located on the object to be identified, and the interrogator or reader, which, depending upon design and the technology used, may be a read or write/read device (herein—in accordance with common usage—the data capture device is always referred to as the reader, regardless of whether it can only read data or is also capable of writing).

The RFID technology offers multiple benefits when compared to other alternatives such as barcodes. Some of the key benefits from the perspective of factory automation include the greater flexibility in packaging, greater and more flexible read-range, larger data storage capability.

Another very significant benefit of RFID technology is related to the read, write and alter capability (as opposed to read only). In addition to recording the identity of the object, it is also possible to track its current state (e.g. processing level, quality data), its past state and its future state (desired end state).

There are two possible methods of controlling a system based upon object data: central and de-central control. In the first method, all elements of the system must be connected, through a network or other means, with a common database in a central computer. In this case, a unique identification number can be stored on a RFID transponder to access all of the relevant data stored in the database. In the second method, the use of readable and writable data carriers opens up the possibility of controlling a system locally, i.e. completely independently of the central process computer. Material and data flow become interlinked. In a manufacturing environment, this is significant since it may be impractical to have all machines and manufacturing systems connected to a single network and central database. This is especially true when a manufacturing process is made up of multiple production steps which may be performed in separate autonomous plants.

Use of Auto ID in a Manufacturing System

The automatic identification techniques are sometimes used in manufacturing environments in order to automate the data acquisition process. The barcode technology is widely used, especially in inventory tracking systems. RFID technology, as it is a newer technology, is not as widely spread. The automotive industry is the sector that is using the most this technology. RFID technology can be found in the following manufacturing applications:

Inventory. Due to the higher cost of the RFID tags compared to barcode labels, this application uses mostly barcodes. This application is very well documented and some companies are working on producing tags that are cheap enough to enable it.

Physical inventory of released material and WIP. This application, although not very common in the industry, is well described in the literature. An example of implementation of such an application can be found at the GM factory in Flint (Mich., U.S.A.) where all engines can be traced in the factory using RFID tags.

Machine set-up and tooling verification. There exist some applications in the industry that address these problems. For example, in the woodworking industry, some German companies equipped the drill bits of their CNC milling machines with RFID technology. The milling machine's program is selected by the operator. The milling machines have integrated readers that are solely used to make sure the milling machine is using the right tool for the milling program that was selected. Another example, in the automotive industry, is the use of this technology in the assembly operations. The car bodies, instead of being identified manually, are fitted with an RFID transponder that has all the body information (BMW's factory in Dingolfing, Germany). This information appears on a screen and is read at each station by the operator to set up each specific station. The collected information is not carried through the stations.

Routing of the WIP. As the goods being produced need to be routed from station to station or from machine to machine, the RFID technology can offer a mean to automate the routing decisions and make sure that all parts go through the right process steps in the right order. This application, although not widely spread in the industry yet, is well described in the literature. One example of such application can be found in the meat industry, where the company J. M. Schneider Meats uses the RFID technology to ensure that the meat sees the right processes in the right order. It also uses the technology to identify and track (WIP tracking) the meat through the process.

Although the above described monitoring systems are useful, they are only adapted to perform a single task. There is a need for a new control and monitoring system that can handle different applications during a manufacturing process.

SUMMARY OF THE INVENTION

It is therefore an aim of the present invention to provide a novel method for globally monitoring and controlling a number of parameters of a manufacturing process.

It is also an aim of the present invention to provide a new monitoring and control data system capable of monitoring and controlling at least two different parameters of a manufacturing process.

It is a further aim of the present invention to provide a clip to attach a transponder to a JEDEC standard tray.

It is a still further aim of the present invention to control and monitor during a manufacturing process the quality of a component having a variable quality due to exposure to an environment.

It is a still further aim of the present invention to provide a new transponder carrier for mounting a transponder to a surface of an object to be tagged.

Therefore, in accordance with the present invention, there is provided a method of monitoring and controlling a manufacturing process having a number of stages, each one of said stages involving receipt of input materials or components, at least one processing action, and discharge of output materials or components, the method comprising the steps of:

(1) providing a manufacturing monitoring and control data system able to identify components to be processed for each of a plurality of said stages for monitoring and controlling, for each of said plurality of stages, applicable ones of:

(a) discharge routing;
  (b) inventory management of said materials or components and/or raw materials to be consumed at said stage;
  (c) processing equipment configuration specific to one of a plurality of input materials or components to be processed by said equipment at said stage;
  (d) quality of at least one of said components; and
  (e) exposure to an environment for at least one of said components, said at least one component having a variable quality due to exposure to said environment;
  wherein at least one of said plurality of stages comprises one of (c), (d) or (e);

(2) collecting monitoring and/or control data at said plurality of said stages during said manufacturing process; and (3) processing said monitoring and control data to provide monitoring and/or control data resulting from said plurality of stages;

whereby said monitoring and controlling is carried across said plurality of stages.

In accordance with a further general aspect of the present invention, there is provided a method of monitoring and controlling a manufacturing process having a number of stages, each one of said stages involving receipt of input materials or components, at least one processing action, and discharge of output materials or components, the method comprising the steps of:

(1) providing a manufacturing monitoring and control data system able to identify components to be processed for each of a plurality of said stages for monitoring and controlling exposure to an environment for at least one of said components, said at least one component having a variable quality due to exposure to said environment;

(2) collecting monitoring and/or control data at said plurality of said stages during said manufacturing process; and (3) processing said monitoring and control data to provide monitoring and/or control data resulting from said plurality of stages.

In accordance with a further general aspect of the present invention, there is provided a clip for removably attaching an electronic data carrier to a tray having at least one side rail, the rail having along a distal end thereof a longitudinally extending ridge extending substantially perpendicularly to a plane of the tray, said clip comprising a body adapted to hold an electronic data carrier, said body having a tray gripping portion adapted to releasably grip the rail of the tray.

In accordance with a further general aspect of the present invention, there is provided a transponder carrier for attaching a transponder to a surface of an object to be tagged, comprising a body defining a cavity for holding a transponder, an opening defined in said body for allowing said transponder to be loaded into said cavity, and an adhesive provided at one location on said body for allowing said transponder carrier to be adhesively secured to a surface of an object to be tagged.

In accordance with a more specific aspect of the present invention, there is provided a system which greatly reduces the human interaction relative to the data transfer, physical verification and process control associated with the movement of components, tooling and operators in a manufacturing system.

This is achieved by the use of data carriers which are attached to the object(s) to be traced. These data carriers can store all the relevant identification, material and production data required by the various elements of the manufacturing system. Various readers, integrated with controllers and application software, are located at strategic points of the production area, including production machines and storage areas, to enable automatic data transfer and physical verification that the right material is at the night place at the right time, using the right tooling.

BRIEF DESCRIPTION OF THE DRAWINGS

Having thus generally described the nature of the invention, reference will now be made to the accompanying drawings, showing by way of illustration a preferred embodiment thereof used in a manufacturing system, and in which:

FIG. 1 shows moisture sensitive labels for sealed bags and shipping boxes;

FIG. 2 shows a material flow inter-plant;

FIG. 3a is a perspective view of a first clip in accordance with a first embodiment of the present invention, shown mounted on an electronic components' tray (that is only partly illustrated)

FIG. 3b is an enlarged elevational view of part of the tray of FIG. 3a;

FIGS. 3c and 3d are respectively perspective and rear elevational views of the clip of FIG. 3a;

FIG. 3e includes top and bottom perspective views of a second clip in accordance with the present invention, shown mounted on a further tray (that is only partly illustrated);

FIG. 3f shows a supporting pouch in accordance with the present invention mounted to a reel (that is only partly illustrated);

FIGS. 3g and 3h show two variants of the supporting pouch for a reel;

FIGS. 3i and 3j show a peel-off supporting pouch for a reel;

FIG. 4 shows a flowchart for moisture sensitive components' tracking system;

FIG. 5a shows a base station comprised of a reader and controller;

FIG. 5b shows an antenna, the coupling element of a reader;

FIG. 10 is a schematic block diagram of a drill down data base structure in accordance with an embodiment of the present invention.

DESCRIPTION OF THE PREFERRED EMBODIMENTS

Figure 6:
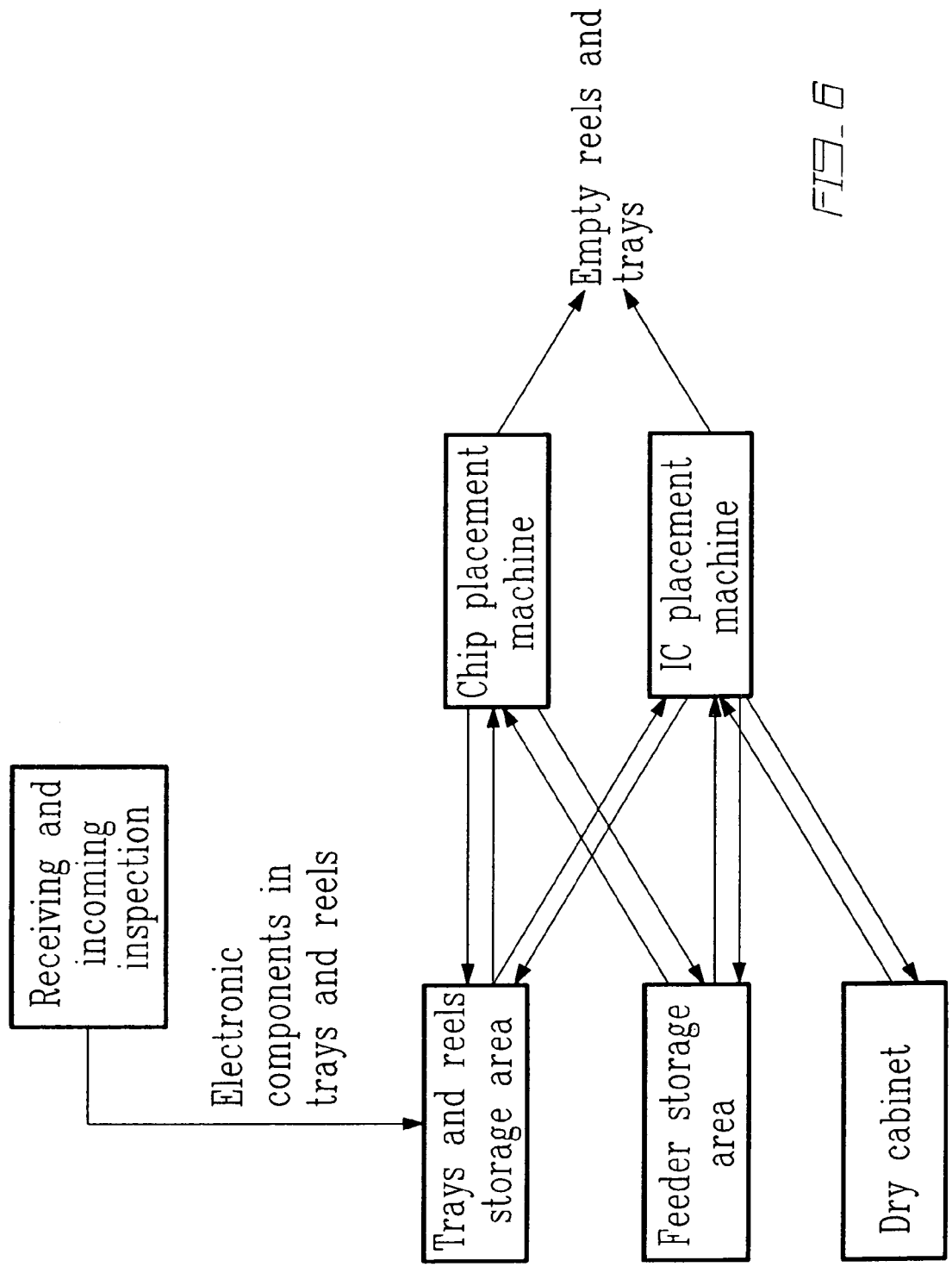
FIG. 6 shows a material flow in a card assembly plant.

In general, the present invention relates to a material data communication system which is part of a production control system. The material data communication system includes data capture devices, control modules, power supplies, communication hardware and software to transfer the captured data. In this instance, the data capture devices employ radio frequency identification (RFID) tracking technology for capturing data from passive data-carrying devices 12 (FIGS. 3f to 3i) which are attached to the production material. In the following description, reference will only be made to the RFID technology, although any other suitable technology could be used for data transfer and capture.

Components of the Control System

1. The transponders or data-carrying devices 12, which are attached to the components, their packaging, the removable tooling and the operators.
2. The readers, which are located at strategic points or stages of the manufacturing system.
3. The controllers, which process the data acquired by the readers.

Definitions of Transponder

The transponder 12, which represents the actual data-carrying device of an RFID system, normally consists of a coupling element and an electronic microchip. When the transponder 12, which does not usually possess its own voltage supply (battery), is not within the interrogation zone of a reader, it is totally passive. The transponder 12 is only activated when it is within the interrogation zone of a reader. The power required to activate the transponder 12 is supplied to the transponder 12 through the coupling unit (contact-less) as is the timing pulse and data.

The transponder 12 also includes a protective packaging for the electronic device and associated coupling element (antenna). It is understood that the transponder can be integrated to a mechanical structure to facilitate its attachment to an object to be identified. The attachment method can be temporary or permanent, based on the most practical and cost-effective solution for each application.

Definition of Reader

The interrogator or reader, depending upon design and the technology used, may be a read or write/read device. A reader typically contains a radio frequency module (transmitter and receiver), a control unit and a coupling element to the transponder 12. In addition, many readers are fitted with an additional interface (parallel or serial communication) to enable them to forward the data received to another system (PC, robot control system, etc.).

The coupling element (antenna) must be optimised for each application in accordance with the basic requirements of the specific RFID technology (frequency), the mechanical constraints and the electromagnetic limitations and interference, in order to provide an adequate read range in combination with the transponder 12. In some applications, many transponders 12 can be at the same time in the range of a reader and the system must be designed with the appropriate anti-collision software and hardware.

Example of Coupling Element

An example of a coupling element is found in a support 14 with antenna for trays and reels 16 shown in FIG. 5b. This coupling element is designed to provide a reliable and convenient method of communication with the tags (transponders). It is customised for plastic trays and reels and the associated tags. The support 14 is a plastic enclosure that is ergonomically shaped to hold trays and reels 16 and at the same time to support and protect the main antenna that communicates with the tags (see FIG. 5b where one reel 16 is shown positioned on the support 14).

The support 14 has a shape that makes it simple for production operators to place the trays and reels in a very specific location. The reels 16 are held almost vertically, with a small angle towards a back wall 18 of the support 14 to stabilise them in this position. The support 14 also has openings (not shown) to provide an easy way to manually grip the trays when they are placed and removed from the support 14. The trays are placed on a horizontal surface to make sure that the components stay securely in place, this horizontal surface being defined in FIG. 5b by the spaced apart upper ends 17 of a widened U-shaped recess 19 defined at the lower front section of the base 20 of the support 14.

The main antenna (not shown) is a large circular coil that is attached to the inside surface of the back wall 18 of the support 14. The relative position of the antenna with respect to the trays and reels 16 is such that it insures proper orientation of the main antenna in the support 14 with the smaller antennas in the tags 12. The electrical circuit of the antenna is tuned such that it provides the optimal range of communication. This insures that all tags 12 that are attached to trays and reels will communicate reliably while they are loaded on the support 14. In addition, any tag that is not properly loaded on the support 14 will not be in the range of the main antenna, thereby eliminating the risk of undesired interference.

Definition of Controller

A controller is the system that receives and processes the data acquired by the reader. In the simplest form, the controller can be integrated with the reader in a portable hand-held unit and this can be used only to display information contained on a transponder 12. This portable unit can be fully autonomous or it can be connected, continuously or punctually, to a host computer through a docking station, radio-frequency communication or other means.

The controller can be a fixed stand-alone system integrated with a reader into a conveyor, production machine, storage area or any other strategic location. In this case, the controller contains a CPU and application software to accomplish a given function including reading or writing information on a transponder. The controller can also be a central host computer which is used for enterprise data management or dedicated to a specific function such as statistical process control.

A typical application may include multiple controllers, with a combination of stand-alone and centralised software controls. These controllers can be, if required, linked together or to any other computer or controlling unit, in order to access databases, share data or simply send commands or status.

Semi-Automatic R/W Operation

Depending on the nature of the application, it may be preferable to use a semi-automatic reader. The semi-automatic designation means that the system requires the intervention of an operator to perform the read/write cycle. This intervention can simply consist of bringing one or more objects with a transponder in the field of a specific reader or to bring a portable reader close to one or more specific transponders. The operator intervention can only consist of starting a specific read/write cycle by pushing a button or selecting a proper software command from a PC user interface. Such a base station 22, when the present invention is used for example in a printed circuit board assembly (PCB) manufacturing system (to be described in details hereinafter), can take the form of a controller 24, a reader 26 and a coupling element as shown in FIG. 5a, with the coupling element (antenna) of this station being housed within the support 14 shown in FIG. 5b.

Fully Automatic R/W Operation

A fully automatic read/write operation implies that no human intervention is required. This is applicable when a reader is integrated, for example, in a conveyor or automated machine. The read/write cycle may be continuous or it can be triggered by appropriate sensors and software or other automatic control systems.

Modular System Architecture

In order to maximise the benefits of an investment in a system based on the present invention, it is preferable that it can handle many different applications. The typical data structure would be different for each type of transponder. For a given type, it would be very beneficial to have a single data structure that can accommodate all potential applications, closed-loop and inter-plant. In this context, it must be recognised that the same transponder may be used in more than one environment and that some data elements might be common to multiple steps while others may be required only for individual applications.

This modular architecture represents a major advantage over known systems. Indeed, it enables it to cumulate many industrial automation applications on the same system (i.e. same identifier, same hardware and software platforms) in a given manufacturing environment. Furthermore, the fact that all interactions between moving objects or parts in the manufacturing system and their environment can be automated adds to the uniqueness of this invention. As an example, an installation of this invention could cumulate a process control function with a WIP tracking function and a routing function. An example of such an application would be in the meat industry. Not only could it track the routing of the meat and ensure it has seen the right processes in the right order, but it could ensure that the time spent in each operation is conform to all norms and that the operations were tooled with the appropriate tooling. It could furthermore ensure that the tooling has seen the right processes before use. All elements of the process control being in place, one could deliver a quality certificate at the end of the line. In the meat industry example, the knives mounted in the cutting machine could be tracked through their cleaning process. Then, on the machine, when the meat arrives, there would be a verification that the right knives that have seen the right cleaning process within a given period of time are used for the right piece of meat.

DETAILED EXAMPLE

Use of the Present Invention in a Printed Circuit Board (PCB) Assembly Manufacturing System (FIG. 6)

In a PCB assembly plant, there is a large number of electronic components, which must be assembled on a PCB with the use of automated production machines of various kinds, following a number of pre-determined specifications and processes. These activities must be performed for multiple products, each one having a unique combination of materials and corresponding tooling and machine programs. In general, the complexity and risk of errors is directly proportional to the quantity of different products that must be produced on a given assembly line and the resulting production changeovers.

In most of these environments, a human operator is typically the central element responsible to interface with the various other elements of the manufacturing system, including the movement of the material, the proper operation of the equipment, the process control and the data transfer between the various elements.

The present invention will now be described with reference to its application with the assembly of printed circuit boards.

1$^{st}$ Example

Transponders on Reels and Trays

Given the existing infrastructure of barcode identification and the relatively high unit cost of a typical transponder, the present example is based on the use of a temporary means to attach the transponder, with different designs adapted to each format of packaging. In this case, the transponders 12 (i.e. the chip and the coupling element) are used in a closed loop cycle. For this reason, the benefits of the system must be more important that the additional cost associated with the attachment and removal of the transponders 12, including the initial data entry. Any application would become even more advantageous if the card assembly plant can receive the reels and trays (FIGS. 3a and 3f) from its suppliers with the transponders 12 already attached thereto and with the data already present in the proper format.

In this application, it is important that the shape and location of the transponders 12 do not affect the normal handling, storage and use of the reels and trays during production. The ease of use (attachment and removal) of these transponders 12 is another important factor.

The transponder 12 for reels, such as reel 16 in FIG. 3f, must not interfere with most common tape feeders of automated placement equipment. The transponder for trays, such as the JEDEC standard tray 28 in FIG. 3a, must allow the trays to be stacked and it must not interfere with most common tray feeders of automated placement equipment.

FIGS. 3a to 3e and 3f to 3j illustrate proposed devices to attach the transponders temporarily respectively to trays 28 and reels 16:

a) In the first case (FIG. 3a), the tag or transponder (i.e. the chip and the coupling element) is encapsulated in a plastic clip 30 (FIGS. 3c and 3d) that will be attached to the trays. FIG. 3a shows the clip 30 attached to the tray 28, whereas FIG. 3c is a perspective view of the clip 30 alone and FIG. 3d is rear view thereof. The clip 30 is made out of process compatible materials that are ESD (electrostatic discharge) sensitive, that can sustain at least 125° C. and that will not contaminate parts with ionic residues or other incompatible contaminants. This clip 30 can also be sized to accommodate a small bar code or label where tray or part identification can be written. The clip 30 is shaped in a manner that it will accommodate the JEDEC standard for the trays by gripping to one of the rails 32 at opposed ends of the tray 28. As illustrated in FIG. 3b, each rail 32 is provided with a longitudinally extending ridge 33 depending downwardly from a distal end of the rail 32. The ridge 33 defines a longitudinally extending channel 35 or female portion. As shown in FIGS. 3c and 3d, the clip 30 includes first and second spring loaded gripping fingers 34 and 36 pivotally mounted to one another for movement between a closed position for gripping one rail 32 of the tray 28 and an open position for allowing the clip 30 to be installed on the 32. The first gripping finger 34 has a L shape that is designed with the right tolerances to fit the female portion 35 of the rail of the JEDEC standard tray 28. The first gripping finger 34 is configured for "hook engagement" with the ridge 33 to retain the clip 30 on the tray 28. As the cross-section of the rail 32 of the tray 28 is the same along its whole length, the clip 30 can slide thereon and be placed anywhere on this rail 32. In order to insert the clip 30, one can slide it, while the same is urged to the open position thereof, from one end of the rail 32. Another way to place the clip 30 on the tray 28 would be to squeeze it such as to open it wide enough so it clears the ridge 33 of the rail 32, then insert it to mate with the female portion 35 of the rail 32 on the other side of the ridge 33 and finally release it so that it grips the rail 32. Once in position on the rail 32, the first and second gripping fingers will respectively engage the ridge 33 and top surface of the rail 32 to prevent the clip 30 from being withdrawn therefrom. Similarly to the first method of insertion, to remove the clip 30, it will have to be slid to the end of the rail 32. In order to accommodate all tolerances of this rail 32, the clip 30 is spring loaded. As shown in FIG. 3d, the loading is given by standard coil springs 38 and 40 that are inserted between the gripping fingers 34 and 36. It also could be given by any other type of spring, as long as the tolerances and the force match those required. As shown in FIGS. 3c and 3d, the first gripping finger 34 is nested into the second gripping finger 36. Another example of loading is given in FIG. 3e. The clip 30' is built in only one part that is spring loaded with an integral spring. The properties of this spring are given by its shape and the properties of the material used. This clip 30' uses the same features as the earlier clip of FIG. 3c to grip to the tray 28. Another way to build the clip, not illustrated here, would be to use a metal that has the right properties to give the right loading. This clip would also use the described features of the tray 28 to grip it.

b) In the second case (FIGS. 3f to 3j), the transponder 12 is in the form of a small disk, the size of a nickel (5¢). As shown in FIG. 3g, the transponder 12 is inserted in a cavity defined in an adhesive holding pouch 42 that will accommodate the transponder 12 temporarily. This pouch 42 is made out of ESD sensitive material, designed and sized to accept the transponder 12 easily, hold it strongly to the reel 16 while in use on the production line and release it easily at the end. The first design in FIG. 3g is made with a flap 44 on a non adhesive side of the pouch 42. The flap 44, once the transponder 12 is inserted, is turned over and glued on an adhesive portion provided on a side 46 of the pouch 42 opposite the non-adhesive side, thereby covering a small portion of the adhesive material and closing a top open end 48 of the pouch 44. Using the rest of the adhesive material, the pouch 44 is glued to the reel 12, as shown in FIG. 3f. In order to ease the removal of the transponder 12, once it is not required on the reel 16 anymore, the pouch can be equipped with dotted lines or other means to weaken the plastic of the pouch 44. The second design shown in FIG. 3h is a straight pouch 42' with an opening at one end. It also has a slot 48' on the sticky side of the pouch 42' that will enable one to enter the transponder 12 easily (back loading). Once the pouch 42' is glued, the slot 48' is not accessible anymore. The pouch 42' is sized to be barely larger than the diameter of the transponder 12 and the latter will therefore not fall off the pouch 42' without a human intervention. In order to remove the transponder 12, one can simply push it towards the open end (top end of Design 2 in FIG. 3h). Other ways to remove the transponder 12 from a pouch include the weakening of the top side of a pouch 42" making it easy to peel off, as shown in FIGS. 3i and 3j. There also exists other means to hold the transponder 12 on the reel 16 (FIG. 3f) inspired by the adhesive pouches, such as for instance the use of double sided sticky tape (reusable or non-reusable), Velcro™, reusable or non-reusable glue applied directly on the transponder 12 or any other means to hold or glue the transponder 12 to a flat surface.

Example of Data Structure: Transponder Attached to a Tray, such as Tray 28 in FIG. 3a, with Electronic Components.

Tray Identification:
  Manufacturer
  Part number
  Revision or Engineering change number
  Date code Component Identification:
  Manufacturer
  Manufacturer part number
  Customer part number
  Date code or lot number
  Quantity
  Partial tray $1^{st}$ row
  Partial tray $1^{st}$ column Process Data:
  JEDEC level
  Maximum exposure time
  Current exposure time
  Status flag (inside dry environment or normal production floor)

Attachment of the Transponders for Trays and Reels

In this application, the transponders are first attached to reels and trays when the latter are unpacked, i.e. before being released to the manufacturing area. If the trays are always handled in stacks, and given that the placement machine always starts to pick from the top tray of a stack, it is possible to attach only one transponder to the bottom tray of each stack. This reduces the number of transponders to attach and the associated handling of the trays.

Transfer of Identification Data

After the transponders have been attached, the information to be entered on the transponders is normally taken from the labels located on the bags or the box containing the reels and trays. Alternatively, this information can be transferred before the transponders are attached. They would then follow the material by being attached to the bags or boxes, using a pouch or some other means. The attachment to the trays, tubes or reel would then take place when the parts are unpacked. This data is either scanned with a standard barcode reader, entered manually or both, and it is transferred to the transponder. This can be achieved with the use of a set-up station, such as the one illustrated in FIG. 5a. As mentioned hereinbefore the station 22 is equipped with a reader 26, a controller 24 including a personal computer and application software. This information typically includes the part number, date code and quantity and it can be used for multiple applications, including, but not limited to the following:

Material Identification

The first benefit from this is the ability to clearly identify the content of any particular tray, anywhere on the production floor. A portable reader of RFID tags can be used to display the PN (i.e. Part Number), the LN (i.e. Lot Number) and the Qty (i.e. Quantity) associated with each transponder. This was not previously possible due to the absence of material identification on a standard plastic tray. This information can also be listed on a computer display. This list would be refreshed as the information is changed and the material is moved.

Moisture Sensitive Components Tracking System (FIG. 4)

There exists a great variety of electronic components that are made with plastic and organic materials which absorb ambient moisture in a manufacturing environment. Because of the high temperatures experienced during solder reflow of the components on the printed circuit boards, these components can suffer internal damage in the form of cracks and delaminations if they are allowed to absorb too much moisture prior to the actual reflow cycle. This problem has been well documented and there are some industry standards that specify the proper shipping, storage and handling procedures for moisture sensitive electronic components.

The standard procedure dictates that the moisture-sensitive components, which are typically packaged in trays or reels, must be placed by the manufacturer inside of sealed dry bags with desiccants and humidity indicators. The bag seal date must be indicated on the label (FIG. 1).

Once these bags are opened at the card assembly locations, there is a predetermined number of hours or days to which the components can be exposed to ambient air prior to placement and reflow. The maximum exposure time varies for each component. This information is indicated on a label which is located on the dry bag.

In a typical production environment, the actual number of hours and days of exposure must be tracked for each individual tray and reel of moisture sensitive components. There exist provisions in the standard to account for storage time in a dry environment. This means that the clock of the total exposure time can be modified while the product is maintained in a dry cabinet for example.

For components that are categorised to be moisture-sensitive, the bags containing the components in trays or reels are typically opened only when the material is required in production. In this case, the standard level of sensitivity and the maximum exposure time in hours or days are also clearly indicated on the bag or box containing the reels or trays. This information is transferred on the transponders at the same time as the material identification. A record of the time and date relative to the opening and the maximum exposure limit is transferred when the bag is opened. Additional information relative to the carriers themselves, such as temperature rating, can be read directly from the carriers and written on the transponders at the same time.

The same, or a similar, set-up station is used to record material movement in and out of a controlled dry air environment. The software takes into account the fact that the clock of total exposed time is modified when the moisture-sensitive components are properly stored. It will furthermore accommodate all dispositions of the standard for moisture sensitive parts. A manual portable reader can be used to verify the remaining exposure time of each individual tray and reel on the production floor. This verification can be done during a new set-up or at specified intervals of time (once per shift). This information can also be found on a computerised list that specifies all moisture sensitive devices presently used and their respective remaining exposure time. This list could also include the location of the parts (machine and feeder location). Additional information could be added, as required. Similarly, lists of parts in dry cabinets, ovens and dry bags could be added with the proper information for each process (exposure time remaining, location, bake time remaining, quantity, etc.). These lists would provide a real-time, centralised and easy-to-access database of all moisture sensitive devices in an assembly plant. They would, in a single operation, enable any operator to understand the physical inventory, the location of the parts and their status.

A further refinement of this system would take into account the ambient temperature and humidity measured by sensors on the production floor and would adjust the expiration date and time accordingly, as specified by the standard.

Whenever components reach their exposure limit, provided that this information is written on the transponder, the system can verify whether the carrier is capable to withstand the high drying temperature and prevent an operator-from using a high temperature process with a low temperature tray.

Such a system can also ensure that the right process steps are followed in the right order with the moisture sensitive devices. Different flags can be used to ensure that conflicting processes are not permitted. For example, one should not be able to put parts in a dry cabinet if the parts are still loaded on a machine or in a bake oven. Another example is the use of the bake process. The standard allows only one bake process without supplier's consultation. Once again, the use of flags enables this control.

Integration to Dry Cabinet, Drying Oven and Placement Machine

For the previous application, a higher level of automation can be achieved by integrating readers and a suitable controller in the dry storage areas, drying oven and in the placement machine.

This integration can be done at different levels. In the simplest form, it can consist of a stand-alone controller with a dedicated reader and application software, located in close proximity to the dry cabinet, drying oven or placement machine. In this case, the operator needs to scan the transponders by bringing the trays or reels in proximity to the reader, within the range of the antenna, each time that the material is moved in or out.

Depending on the application the software may be used simply to update the information in a database or on the transponder. For example, when reels and trays are scanned before being placed inside a dry storage area, the status flag is switched to "inside dry environment". Whenever the same trays and reels are scanned after being taken out of the dry storage area, the expiration date and time are recalculated based on a pre-determined set of rules, and reset on the transponder. At the same time the status flag is switched back to "in normal production environment". The status flag is used to make sure that the operator did not forget to scan the transponders when the material was entered or removed from dry storage.

According to the needs of each specific application, the user interface may consist of a simple set of visual or audible signs to indicate a "good read" or to indicate a process alarm. It may also include a complete display and keyboard. In this application, a display could, for example, indicate the remaining exposure tine each time that the material is removed from dry storage.

In the case of a production equipment which possess its own controller or CPU, the reader/controllers may also be directly connected to the equipment, using a standard (RS-232, SECS/GEM) or custom communication hardware and software interface. This would enable automatic data transfer and potentially request actions from the production machine, such as the activation of an interlock or the generation of error messages. The highest level of integration consists of installing a reader directly inside the machine envelope and to use the controller and software of the actual production machine to perform the appropriate process control.

By integrating antennas at strategic locations, it is possible to transfer the necessary data and update the information on the transponders with no operator intervention, thereby improving the efficiency of the operations and reducing the risk of errors. The following examples demonstrate practical solutions relative to the control of moisture-sensitive components.

On a placement machine, before a reel or tray of moisture-sensitive parts exceed the specified time limit, a pre-alarm can be generated to advise the operator to take appropriate action. If the material is expired, the system can also engage an interlock to prevent the placement of the components by the machine.

On a dry storage area, such as a dry cabinet, a reader and associated controller can be integrated to automatically register the material moving in and out of the cabinet and to update the expiration date and time and status flag on the transponders accordingly.

On a drying oven, a reader and associated controller can be integrated to automatically register the material being dried and to reset the expiration date once the drying cycle is completed. In addition, it can also prevent use of the oven if the container (tray or reel) is not compatible with the set temperature.

When integrating with the placement machine, or other type of machines, it may occur, depending on the machine configuration, that the tags are not visible to the reader. As an example, the reels 16 are generally loaded in feeders 50 who are in turn loaded on feeder banks 52 that are fully hooked up to machines 54, as illustrated in FIG. 10. In such cases, it would be possible to tag the reels 16, the feeders 50 and the feeder banks 52. The information flow would then enable someone to drill down from a machine to a given feeder bank, to a feeder in a given slot of the given feeder bank, to the reel and parts information. All this could be done simply by reading the feeder bank identification and follow the information flow.

Feeder Set-Up Validation

A further development of the integration to a placement equipment includes a feeder set-up validation. In this application, the transfer of the part number information from the transponder on a reel can be made faster and in a more automated manner than with a traditional barcode label. This can be done through the use of a dedicated set-up station or hand-held reader, whichever is more practical for the specific machine. This application can also be extended to components in trays, which is not possible with prior methods.

A further refinement of this application consists of integrating readers directly onto the placement machine thereby enabling complete automation of the verification process.

Set-Up Validation

The previous application can be taken further if the removable tooling is tagged. The validation would not only be for the raw material but could include the validation that all the right peripherals are used. All this could be triggered automatically if the product being assembled was tagged as well. It would then identify itself and start the validation process.

Update of Remaining Quantity

Another benefit from this new approach is to allow the update of the remaining quantity directly on the transponder on the reels, even when they are removed from the feeders, without having to manually write the revised quantity on a label or to reprint a new barcode label. This also enables a similar application for components in trays which is not possible with prior methods. Ultimately, the readers can be fully integrated in the placement equipment such that no local memory is required on the feeders and no manual scanning operation is required from the operator.

Partial Tray Information

This is a further development from the present invention relative to the integration with a placement machine. Every time that a partial tray needs to be removed from the machine, the information relative to the last component picked is first transferred to the transponder attached to the tray. This data can be recorded with a row number and column number for example. Then, the tray can be stored temporarily and the partial tray information is uploaded to the placement machine during the next set-up. This system reduces significantly the operator intervention, which reduces the set-up time and potential damage to components.

Traceability

Yet another further development is to transfer the lot number or batch number information associated with each reel to enable complete traceability of the components used to assemble a specific batch or serial number of PCB. Once again, this is also true for components in trays, and this is not possible with prior methods. This process could be fully automated if the PCBs were tagged as well.

Real-Time Inventory Control and Physical Location of Material in WIP

The information on each transponder can also enable real time inventory control of the tagged material on the production floor. As described in the previous placement machine integration, the exact quantity and location of each reel and tray of components loaded on every machine is already available locally. The next step consists of integrating readers at other material storage locations, which mainly consist of various shelves, cabinets and carts. This can be achieved in many different configurations, by increasing the number of readers based on the level of resolution that is required and the overall cost of the system. At one extreme, the transponders can be scanned with a hand-held reader when they enter a given section of the manufacturing floor. Another option is to integrate one reader for each storage unit, each shelf, each section of each shelf, etc. In order to reduce the cost of the overall system, many antennas can be multiplexed through a single read/write card controller. The integration of all the individual elements in a single network allows for centralised real-time inventory control.

A storage area can include additional features to simplify the interface with the operator. For example LEDs can be located at each individual storage area to indicate the location where the material needs to be placed or removed. A more sophisticated system can include a series of digital displays to show information relative to the material in a given storage area. Computer lists with defined location can also be used.

One of the obvious benefits of this system includes the ability to rapidly locate any specific reel or tray of components.

Inter-Plant Information Transfer (FIG. 2)

The above applications can be further enhanced by using the same transponders between various manufacturing locations in the supply chain.

In this case, the transponders can still be attached temporarily but it may be more practical to attach them permanently. This can be done through the use of an external device that is attached to the object to track. Another alternative is to insert the transponder directly inside the object, during the initial fabrication process (e.g. plastic moulding) or at a subsequent operation, such as drilling a hole in the carrier.

In the context of an inter-plant application it becomes critical that all the elements are designed to be compatible with each other and to accommodate the various requirements from each different application. This means that the transponders, readers and associated software must be designed as a complete system. The common elements of an inter-plant system are the transponder technology and its communication and data structure.

Semiconductor Packaging Plant to Card Assembly Plant

From the perspective of the card assembly plant, it would be very beneficial to receive, from their component suppliers, the trays and reels already equipped with transponders containing the information required, such as part number, lot number, quantity, JEDEC moisture sensitivity level, packaging date and time, etc. In this case, all the relevant data can be used to automate the receiving of the components and initiate the proper applications.

Carrier Manufacturer to Semiconductor Packaging Plant

In one embodiment of the present invention, all the data relative to the manufacture of the tray is written directly on the transponder at some point in the manufacturing process. This information may include the following: manufacturer, part number, EC#, description, physical dimensions, maximum temperature rating, etc. This information can be read by an operator, using a hand-held reader, to insure that the proper tray is being used for the proper product in a given process.

At the same time, the transponder can be used to store information relative to the components that it contains, including identification data, process data, physical data, etc. From a different perspective, similar applications and benefits can be derived during the component manufacturing process as was described in the card assembly process.

A further refinement of this invention consists of integrating readers in the automated equipment that handles the trays at various operations.

Recycling of Trays and Reels

Recycling companies can greatly benefit from the presence of a transponder on the trays to be recycled. This allows a rapid and accurate recognition and classification of any tray such that it can be sorted out more efficiently. This identification method can eventually enable higher levels of automation and reduce errors in the sorting process.

Before returning the trays to the original manufacturer or directly to a semiconductor packaging plant, the recycling company can verify that the proper information is indicated on the transponder attached to the tray and it can remove any additional data that was associated with the previous usage.

For example, the information to be left on the transponder might include the same data that was provided by the original tray manufacturer, as described earlier. It may also contain information relative to the recycling process, such as the recycling company, the number of recycling loops, etc. However, it might be desirable to remove other data that is no longer relevant such as the data relative to the electronic components that it contained.

Design and Assembly Data

Provided that there is a sufficiently large memory available on the transponder, the containers can also be used to automatically transfer the basic data required for the initial set-up of the production equipment.

Whenever a new component is loaded on a placement machine this allows the automatic transfer of the required information such that the machine can program itself without human intervention. This can include all physical dimensions relative to a shipping tray, including the data relative to the matrix of rows and columns. It can also include the data relative to the components themselves, including package type, number of leads, lead length, etc.

Another alternative consists of using the basic material identification (manufacturer, part number) to access an external database which contains the required design data in a format that can be uploaded to the production machine. This database can be maintained by the tray and component manufacturers and it can be accessed through the Internet.

Automatic Machine Start-Up

Furthermore, from the previous application, if the PCBs are tagged, the appropriate information could be available from the tag or from an accessed database in order to program the placement machine for a given part number. Once the machine is loaded with the PCB and the appropriate raw material, it programs itself to do the assembly.

Routing of Parts

Once the PCBs are tagged, the routing to the next process step can be automated. The PCB can route itself, depending on certain quality or process reports. For example, a decision to go to inspection, rework or the next assembly step can be taken, depending on certain results in the actual process step.

Quality Certificate

It would also be possible to keep track that the parts have seen all the required process steps and passed all quality checks. This would ensure that the outgoing product conforms to quality standards, similar to a personalised ISO 9000 certificate.

Integration to the Business Process

Figure 7:
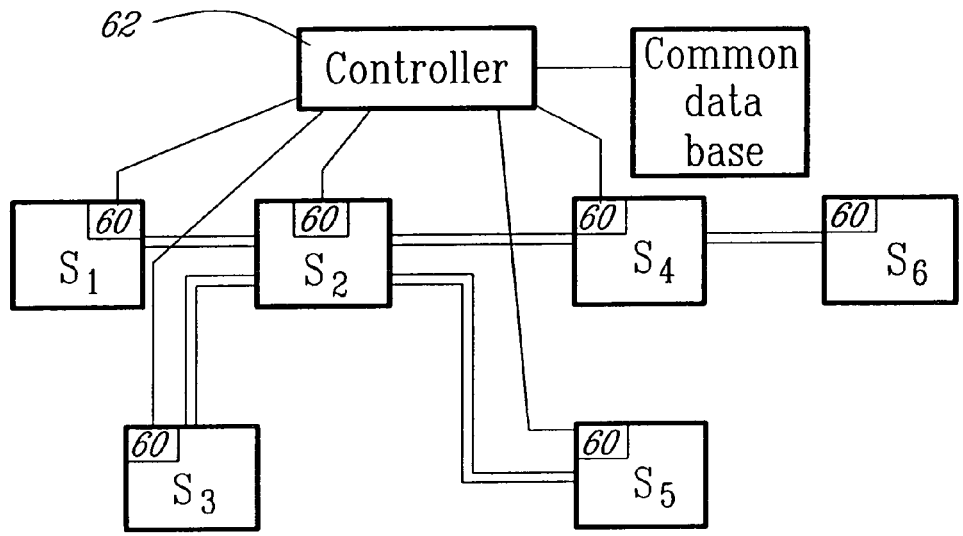
FIG. 7 is a schematic view of a manufacturing plant equipped with a number of monitoring and control systems in accordance with an embodiment of the present invention.

This invention, as it relates to data acquisition and processing, will influence greatly the business processes in a manufacturing plant. It can influence one or many of the following processes:

1. Shop floor management system. This system will now be linked to a real time data acquisition system. It will then be possible to know various information such as the following:
   a. Yield loss at a given operation
   b. Percentage of reworked parts
   c. Raw material used per lot
   d. Units produced per hour at a given operation
   e. Production lots movements
   f. Estimate of the time remaining before a job comes out of production
   g. Overall equipment efficiency
   h. Raw material movements
2. Production line and cost improvement. With the information listed above, it will be possible to know exactly where are the pinch points and the less efficient sectors. The line improvements can then be directed to the right places.
3. New product introduction. As all the product information can be available directly to the different process centres and equipment, a new product can program itself on the automated equipment with no or minimal human intervention. This makes it possible to introduce a new product rapidly on a manufacturing line.
4. Prototyping and small production lots. Furthermore, machine changeover from a product part number to a different one can be automated. This reduces greatly the time needed for a changeover and makes it possible and economically viable to reduce the production lot size.
5. Transparency with the customers. As all this information is available in real time, it will be possible to post it on the Internet, with the right security access, available to customers.
6. WIP and inventory tracking. This information can now be uploaded in real time to a central system (ERP, MRP or other).
7. Costing. As all the information relative to raw material utilisation, yield (percentage of good parts), rework, tool utilisation and labour is available for any given lot, it is possible to determine precisely its cost.
8. Projections. Having all this historical information available, it will be much easier to make projections on the following:
   a. Equipment and tooling required for a given amount of production
   b. Manpower required
   c. Raw material required
   d. Costing FIG. 7 illustrates a manufacturing plant comprising a number of stages or stations $S_1$, $S_2$, $S_3$, $S_4$, $S_5$ and $S_6$. Each one of the stages $S_1$, $S_2$, $S_3$, $S_4$, $S_5$, $S_6$ involves receipt of input materials, such as raw material, and/or components, such as parts or pieces of a product; a processing action and discharge of output materials. A monitoring and control data system 60 is integrated to each of the stages $S_1$, $S_2$, $S_3$, $S_4$, $S_5$ and $S_6$ for identifying the components and the input materials to be processed thereat. The components and the input materials are preferably tagged with RFID tags containing appropriate information thereon. Some of the systems 60 are linked together via a common central controller 62 and associated data base. This allows the linked systems 60 to share the data collected at stages $S_1$, $S_2$, $S_3$, $S_4$, and $S_5$. However, it is understood that the stages $S_1$, $S_2$, $S_3$, $S_4$, $S_5$ and $S_6$ do not absolutely have to be linked through a common interface, as the information can be carried through the stages $S_1$, $S_2$, $S_3$, $S_4$, $S_5$ and $S_6$ via the RFID tags attached to the input materials and components to be processed. In this case, the information would be up-dated directly on the tags.

Figure 8:
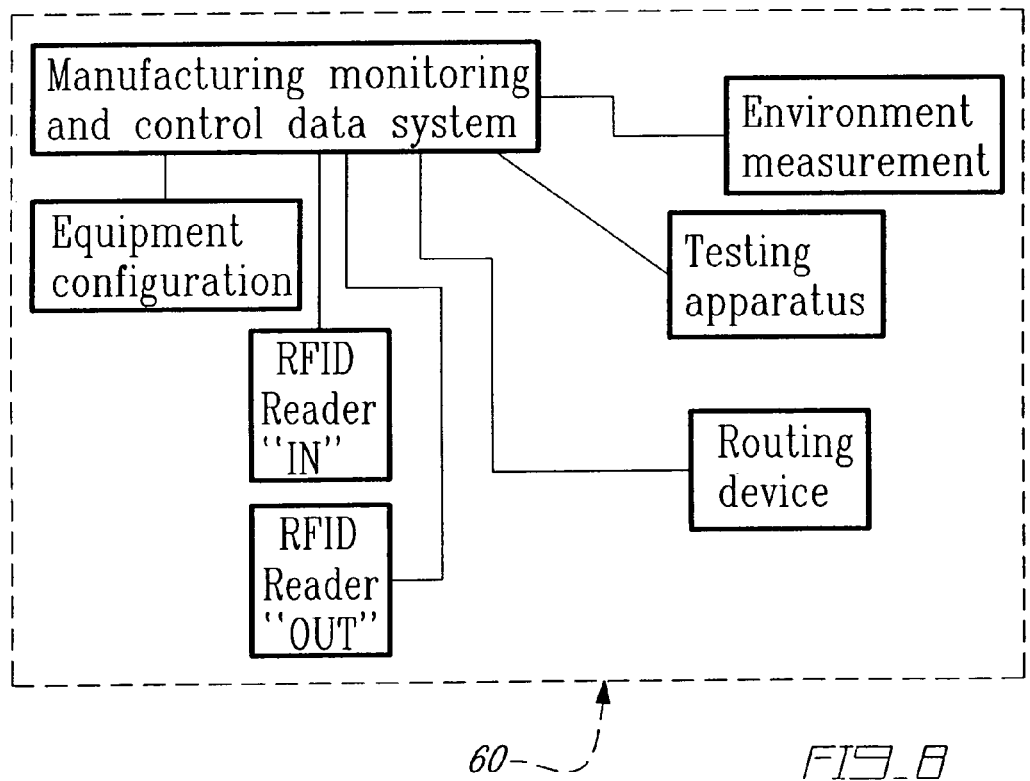
FIG. 8 is a detailed schematic block diagram of a control and monitoring system according to one embodiment of the present invention.

As illustrated in FIG. 8, each system 60 can advantageously be interfaced with a variety of peripherals to collect numerous data associated to a variety of applications. For instance, the system 60 illustrated in FIG. 8 could include a pair of RFID readers to register the material moving in and out of a stage. Alternatively, this could be accomplished with a single reader. The readers read the information contained on the tags and transfer the information to the controller and dedicated software(s). The software(s) can be used for monitoring and controlling applicable ones of:

(a) discharge routing;
(b) inventory management of the materials or components and/or raw materials to be consumed at each stage;
(c) processing equipment configuration specific to one of a plurality of input materials or components to be processed by equipment at each stage;
(d) quality of at least one of the components; and
(e) exposure to an environment for at least one of the components having a variable quality due to exposure to such an environment.

The system 60 in FIG. 8 is interfaced with testing apparatuses, such as x-rays testing devices, temperature sensors, humidity sensors, routing devices and equipment configuration devices to automatically perform the applicable tasks. The quality monitoring can involve the monitoring of the temperature and the humidity of a given environment as well as the exposure time of a component to this environment. The data collection can be done automatically with sensors or manually with manual entry of the collected data into the system. The quality monitoring could, for instance, be used in connection with moisture sensitive devices, perishable products, such as meat, other food products, such as cheese which necessitates exposure to certain environments for a certain time, and various glues used for assembling electronic components. Such glues are normally kept in a freezer and have a predetermined life expectancy. The glues cannot be used for a certain time after they have been removed from the freezer and can only be used thereafter for a limited time.

To provide automatic set up configuration of the tooling at a stage, the equipment could also be tagged with a RFID tag so that the controller and associated software can properly configure the equipment according to the data obtained from the tags on the components and/or material and the equipment or tooling used to act thereon.

Figure 9:
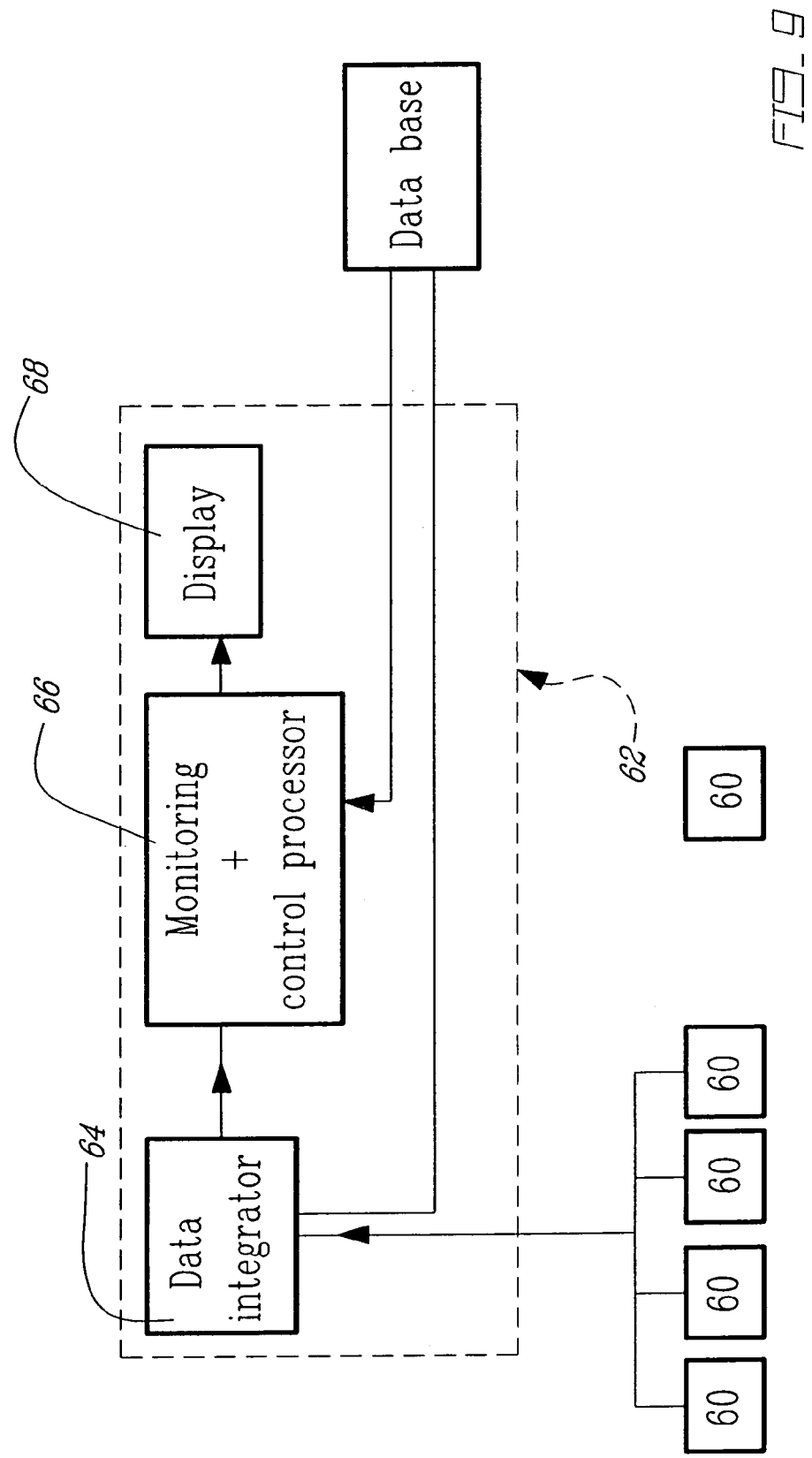
FIG. 9 is a schematic block diagram illustrating how the collected information is transferred and processed.

As seen in FIG. 9, the central controller 62 can comprise a data integrator 64, a monitoring and control processor 66 and a display device 68 wherein the data integrator 64 is provided for allowing the data collected by the systems 60 to be gathered in a useful and practical way. The display device 68 is provided for allowing an operator to readily obtain a given information flowing from the data collected by the systems 60.

We claim:

1. A method of monitoring and controlling a manufacturing process having a number of stages, each one of said stages involving receipt of input materials or components, at least one processing action, and discharge of output materials or components, the method comprising the steps of:
   (1) providing a manufacturing monitoring and control data system able to identify components to be processed for each of a plurality of said stages for monitoring and controlling, for each of said plurality of stages, applicable ones of:
      (a) discharge routing;
      (b) inventory management of said materials or components and/or raw materials to be consumed at said stage;
      (c) processing equipment configuration specific to one of a plurality of input materials or components to be processed by said equipment at said stage;
      (d) quality of at least one of said components; and
      (e) exposure to an environment for at least one of said components, said at least one component having a variable quality due to exposure to said environment;
   wherein at least one of said plurality of stages comprises one of (c), (d) or (e);
   (2) collecting monitoring and/or control data at said plurality of said stages during said manufacturing process; and
   (3) processing said monitoring and control data to provide monitoring and/or control data resulting from said plurality of stages;
   whereby said monitoring and controlling is carried across said plurality of stages;
   wherein said processing in step (3) comprises determining an exposure time interval of said at least one component to said environment; and further comprising the step of comparing said exposure time interval with a predetermined maximum exposure time value, and providing indication that said at least one component is at least one of: expired when said exposure time interval exceeds said predetermined maximum exposure time value; and close to expiration when said expiration time interval has approached said predetermined maximum exposure time value by a pre-selected warning period.

2. A method as claimed in claim 1, wherein step (2) comprises recording a time of receipt and a time of discharge of said at least one component from said environment.

3. A method as claimed in claim 2, wherein step (3) comprises processing said time of receipt and said time of discharge to obtain said exposure time interval.

4. A method as claimed in claim 1, further comprising the steps of determining the remaining exposure time available for said at least one component, recording said remaining exposure time as a life data and updating said life data each time said at least one component is exposed to said environment.

5. A method as claimed in claim 4, wherein said life data is stored and updated on at least one of: a central database and an ID tag of said at least one component.

6. A method as claimed in claim 1, further comprising the step of sensing at least one of a temperature level and a humidity level of said environment, and adjusting the value of said exposure time interval as a function of said temperature and humidity level.

7. A method as claimed in claim 1, wherein said at least one component is a moisture sensitive electronic component normally stored in a sealed container adapted to be opened at least one predetermined stage of said plurality of stages.

8. A computer program product comprising a program code for carrying out the method of claim 1.

9. A method of monitoring and controlling a manufacturing process having a number of stages, each one of said stages involving receipt of input materials or components, at least one processing action, and discharge of output materials or components, the method comprising the steps of:
   (1) providing a manufacturing monitoring and control data system able to identify components to be processed for each of a plurality of said stages for monitoring and controlling, for each of said plurality of stages, applicable ones of:
      (a) discharge routing;
      (b) inventory management of said materials or components and/or raw materials to be consumed at said stage;
      (c) processing equipment configuration specific to one of a plurality of input materials or components to be processed by said equipment at said stage;
      (d) quality of at least one of said components; and
      (e) exposure to an environment for at least one of said components, said at least one component having a variable quality due to exposure to said environment;
   wherein at least one of said plurality of stages comprises one of(c), (d) or (e);
   (2) collecting monitoring and/or control data at said plurality of said stages during said manufacturing process; and
   (3) processing said monitoring and control data to provide monitoring and/or control data resulting from said plurality of stages;
   whereby said monitoring and controlling is carried across said plurality of stages;

wherein said processing in step (3) comprises determining an exposure time interval of said at least one component to said environment and further comprising the step of updating an expiration date and time of said at least one component each time said component is exposed to said environment, said expiration date and time being determined on the basis of a predetermined maximum exposure time value of said at least one component.

10. A method of monitoring and controlling a manufacturing process having a number of stages, each one of said stages involving receipt of input materials or components, at least one processing action, and discharge of output materials or components, the method comprising the steps of:
(1) providing a manufacturing monitoring and control data system able to identify components to be processed for each of a plurality of said stages for monitoring and controlling, for each of said plurality of stages, applicable ones of:
 (a) discharge routing;
 (b) inventory management of said materials or components and/or raw materials to be consumed at said stage;
 (c) processing equipment configuration specific to one of a plurality of input materials or components to be processed by said equipment at said stage;
 (d) quality of at least one of said components; and
 (e) exposure to an environment for at least one of said components, said at least one component having a variable quality due to exposure to said environment;
wherein at least one of said plurality of stages comprises one of (c), (d) or (e);
(2) collecting monitoring and/or control data at said plurality of said stages during said manufacturing process; and
(3) processing said monitoring and control data to provide monitoring and/or control data resulting from said plurality of stages;
whereby said monitoring and controlling is earned across said plurality of stages;
wherein at least one of said plurality of stages is provided with tooling to act on said input materials and said components, said tooling being tagged with a data carrier, and wherein the step of collecting monitoring and/or control data further comprises the step of collecting data from said data carrier, and
further comprising the steps of using said data carrier to track said tooling through a treatment process thereof, and, when said input materials and said components arrive at said at least one stage, reading said data carrier to ensure that the right tooling that has seen the right treatment process is used.

11. A method as claimed in claim 10, further comprising the step of transferring tool identification data to said data carrier.

12. A method as claimed In claim 11, further comprising the step of processing the data obtained from said data carrier to ensure that the right tooling is used when the input materials and the components arrive at said at least one stage.

13. A method of monitoring and controlling a manufacturing process having a number of stages, each one of said stages involving receipt of input materials or components, at least one processing action, and discharge of output materials or components, the method comprising the steps of:
(1) providing a manufacturing monitoring and control data system able to identify components to be processed for each of a plurality of said stages for monitoring and controlling, for each of said plurality of stages, applicable ones of:
 (a) discharge routing;
 (b) inventory management of said materials or components and/or raw materials to be consumed at said stage;
 (c) processing equipment configuration specific to one of a plurality of input materials or components to be processed by said equipment at said stage;
 (d) quality of at least one of said components; and
 (e) exposure to an environment for at least one of said components, said at least one component having a variable quality due to exposure to said environment;
wherein at least one of said plurality of stages comprises one of (c), (d) or (e);
(2) collecting monitoring and/or control data at said plurality of said stages during said manufacturing process; and
(3) processing said monitoring and control data to provide monitoring and/or control data resulting from said plurality of stages;
whereby said monitoring and controlling is carried across said plurality of stages;
wherein said step of collecting comprises reading ID information from ID tags attached one of directly to said components and said input materials and to containers for said components and said input materials;
wherein said containers include JEDEC standard trays, wherein said ID rags include electronic data carriers, and wherein the method further comprises prior to step (2) the step of mounting one of said electronic data carriers on at least one of said JEDEC standard trays to provide ID information thereon; and
wherein said one of said electronic data carriers is releasably mounted to one of said JEDEC standard trays with a clip.

14. A method as claimed in claim 13, wherein said ID tags comprise RFID tags.

15. A method as claimed in claim 13, further comprising the step of updating the ID information contained on said ID tags while said components and said input materials are at said plurality of stages.

16. A method as claimed in claim 13, wherein said ID tags are read/write electronic tags, wherein a reader is provided at each of said plurality of stages, and wherein the step of updating the ID information of one of said read/write electronic tag is effected by transmitting from the reader of the stage at which the tag is located a write signal containing data to be written to said read/write electronic tag.

17. A data signal embodied in a carrier wave which when loaded into a computer provides a method of monitoring and controlling a manufacturing process having a number of stages, each one of said stages involving receipt of input materials or components, at least one processing action, and discharge of output materials or components, the method comprising the steps of:
(1) providing a manufacturing monitoring and control data system able to identify components to be processed for each of a plurality of said stages for monitoring and controlling, for each of said plurality of stages, applicable ones of:
 (a) discharge routing;
 (b) inventory management of said materials or components and/or raw materials to be consumed at said stage;

(c) processing equipment configuration specific to one of a plurality of input materials or components to be processed by said equipment at said stage;

(d) quality of at least one of said components; and (e) exposure to an environment for at least one of said components, said at least one component having a variable quality due to exposure to said environment;

wherein at least one of said plurality of stages comprises one of (c), (d) or (e);

(2) collecting monitoring and/or control data at said plurality of said stages during said manufacturing process; and (3) processing said monitoring and control data to provide monitoring and/or control data resulting from said plurality of stages;

whereby said monitoring and controlling is carried across said plurality of stages.

18. A method as claimed in claim 17, further comprising the step of integrating said monitoring and control data from said monitoring and control data systems from each of said plurality of stages before processing said monitoring and control data.

19. A method as claimed in claim 18, wherein the step of integrating comprises exchanging monitoring and control data between said monitoring and control data systems of said plurality of stages.

20. A method as claimed in claim 17, wherein said at least one stage further includes an operator, said operator being tagged with a data carrier, and wherein said collecting monitoring and/or control data in step (2) further comprises the step of collecting data from said data carrier.

21. A data signal as claimed in claim 17, wherein the method further comprises the step of transferring identification data collected on each of the input material and the components used in the manufacturing of a product to a data carrier associated therewith, thereby enabling complete traceability of the input materials and components of the product.

22. A data signal as claimed in claim 17, wherein, in the method at least two of (a), (b), (c), (d), (e) are found in at least one of said plurality of stages.

23. A data signal as claimed in claim 17, wherein, in the method, said manufacturing monitoring and control data systems monitor at least (c), (d) and (e).

24. A data signal as claimed in claim 17, wherein, in the method, at least one of said plurality of stages comprises each one of (a), (b), (c), (d) and (e).

25. A data signal as claimed in claim 17, wherein step (1) of the method comprises interfacing at least some of said manufacturing monitoring and control data systems to enable said systems to communicate with each other.

26. A data signal as claimed in claim 25, wherein, in the method, the step of interfacing is effected by linking said manufacturing monitoring and control data systems to a common central controller.

27. A data signal as defined in claim 17, wherein, in the method, at least one of said plurality of stages is a storage area, the method further comprises the steps of: tagging the components and materials to be stored in said storage area with ID tags, and integrating at least one reader and associated controller to said storage area in order to register the materials and the components moving in and out of said storage area.

28. A data signal defined in claim 17, wherein the method further comprises the step of processing said monitoring and control data to provide business process data from said plurality of stages.

29. A data signal defined in claim 17, wherein, in the method, an identification of at least one of said components to be processed is associated with a container identification for a container of said at least one component, and wherein said collecting comprises retrieving said identification of said at least one component via said container identification.

30. A data signal as claimed in claim 17, wherein, in the method, said manufacturing and control data systems monitor and control at least two different ones of (a) to (e).

31. A data signal as claimed in claim 17, wherein, in the method, said manufacturing and control data systems monitor (e) at said plurality of stages.

32. A method of monitoring and controlling a manufacturing process having a number of stages each one of said stages involving receipt of input materials or components, at least one processing action, and discharge of output materials or components, the method comprising the steps of:

(1) providing a manufacturing monitoring and control data system able to identify components to be processed for each of a plurality of said stages for monitoring and controlling, for each of said plurality of stages, applicable ones of:

(a) discharge routing;

(b) inventory management of said materials or components and/or raw materials to be consumed at said stage;

(c) processing equipment configuration specific to one of a plurality of input materials or components to be processed by said equipment at said stage;

(d) quality of at least one of said components; and (e) exposure to an environment for at least one of said components, said at least one component having a variable quality due to exposure to said environment;

wherein at least one of said plurality of stages comprises one of (c), (d) or (e);

(2) collecting monitoring and/or control data at said plurality of said stages during said manufacturing process; and (3) processing said monitoring and control data to provide monitoring and/or control data resulting from said plurality of stages;

whereby said monitoring and controlling is carried across said plurality of stages;

wherein some of said stages are at different manufacturing locations; and wherein said manufacturing locations include a supplier plant, a product assembly plant and a recycling plant, and wherein said product assembly plant includes a first stage for receiving from the supplier plant component carriers already tagged with ID tags, and wherein said recycling plant includes a stage for receiving the tagged component carriers from the product assembly plant.

* * * * *